US010844763B2

(12) United States Patent
MacDonald et al.

(10) Patent No.: US 10,844,763 B2
(45) Date of Patent: Nov. 24, 2020

(54) PROCESS FOR DIRECT UREA INJECTION WITH SELECTIVE CATALYTIC REDUCTION (SCR) FOR NOX REDUCTION IN HOT GAS STREAMS AND RELATED SYSTEMS AND ASSEMBLIES

(71) Applicant: R.F. MacDonald Co., Modesto, CA (US)

(72) Inventors: Michael David MacDonald, Modesto, CA (US); Marco Antonio Velasco, Modesto, CA (US); Anthony Feliz, Cucamonga, CA (US); Lawrence J. Muzio, Laguna Niguel, CA (US)

(73) Assignee: R. F. MacDonald Co., Modesto, CA (US)

( * ) Notice: Subject to any disclaimer, the term of this patent is extended or adjusted under 35 U.S.C. 154(b) by 127 days.

(21) Appl. No.: 15/912,865

(22) Filed: Mar. 6, 2018

(65) Prior Publication Data

US 2018/0258814 A1    Sep. 13, 2018

Related U.S. Application Data

(60) Provisional application No. 62/469,863, filed on Mar. 10, 2017.

(51) Int. Cl.
    *B01D 53/86*    (2006.01)
    *F01N 3/20*    (2006.01)
    (Continued)

(52) U.S. Cl.
    CPC ......... *F01N 3/208* (2013.01); *B01D 53/8631* (2013.01); *B01D 53/9495* (2013.01);
    (Continued)

(58) Field of Classification Search
    CPC ... F01N 3/2066; F01N 2610/02; F23J 15/003; F23J 2215/10; F23J 2219/10; F23J 2610/02
    See application file for complete search history.

(56) References Cited

U.S. PATENT DOCUMENTS

| 4,981,660 A | 1/1991 | Leach |
|---|---|---|
| 4,985,218 A | 1/1991 | DeVita |

(Continued)

FOREIGN PATENT DOCUMENTS

| EP | 0791389 | 8/1997 |
|---|---|---|
| WO | 2008126118 | 10/2008 |
| WO | 2010133716 | 11/2010 |

OTHER PUBLICATIONS

R. F. MacDonald Co., "New Boiler Using Selective Catalytic Reduction (SCR) to Meet Requirements," brochure (Mar. 15, 2016) 2 pages, http://rfmacdonald.com/casestudies/RFM-LeprinoFoodsWest.pdf.

(Continued)

*Primary Examiner* — Jonathan R Matthias
(74) *Attorney, Agent, or Firm* — SmithAmundsen LLC

(57) ABSTRACT

A boiler or other fired vessel includes a housing with a burner at one end, a furnace downstream of the burner, a convection section downstream of the furnace and a flue gas outlet downstream of the convection section. A first means for loading a reducing agent comprising at least two injectors is located downstream of the furnace. A second means for loading a reducing agent is located downstream of the first means for loading a reducing agent. A selective catalytic reduction catalyst is located either downstream of the second means for loading a reducing agent or adjacent the second means for loading a reducing agent such that the catalyst is provided to the boiler or other fired vessel approximately (Continued)

simultaneously with the reducing agent from the second means for loading the reducing agent.

12 Claims, 6 Drawing Sheets

(51) Int. Cl.
*F01N 3/10* (2006.01)
*F01N 11/00* (2006.01)
*B01D 53/94* (2006.01)

(52) U.S. Cl.
CPC .............. *F01N 3/10* (2013.01); *F01N 11/002* (2013.01); *F01N 2560/06* (2013.01); *F01N 2570/14* (2013.01); *F01N 2610/02* (2013.01); *F01N 2610/144* (2013.01); *F01N 2900/0416* (2013.01); *F01N 2900/1404* (2013.01); *Y02T 10/12* (2013.01); *Y02T 10/40* (2013.01)

(56) References Cited

U.S. PATENT DOCUMENTS

| | | | |
|---|---|---|---|
| 5,233,934 A | 8/1993 | Krigmont et al. | |
| 5,240,688 A | 8/1993 | von Harpe et al. | |
| 5,281,403 A | 1/1994 | Jones | |
| 5,286,467 A | 2/1994 | Sun et al. | |
| 5,315,941 A | 5/1994 | Vetterick et al. | |
| 5,399,325 A | 3/1995 | von Harpe et al. | |
| 5,543,123 A | 8/1996 | Hofmann et al. | |
| 5,585,081 A | 12/1996 | Chu et al. | |
| 5,601,792 A | 2/1997 | Hug et al. | |
| 5,616,307 A | 4/1997 | Dubin et al. | |
| 5,738,024 A | 4/1998 | Winegar | |
| 5,827,490 A | 10/1998 | Jones | |
| 6,048,510 A | 4/2000 | Zauderer | |
| 6,190,628 B1 | 2/2001 | Carter | |
| 6,468,489 B1 | 10/2002 | Chang et al. | |
| 6,507,774 B1 | 1/2003 | Reifman | |
| 7,223,372 B2 | 5/2007 | Wakasa et al. | |
| 7,615,200 B2 | 11/2009 | Lin et al. | |
| 7,815,881 B2 | 10/2010 | Lin et al. | |
| 7,901,645 B2 | 3/2011 | Ukai et al. | |
| 7,906,090 B2 | 3/2011 | Ukai et al. | |
| 8,062,617 B2 | 11/2011 | Stakhev et al. | |
| 8,113,822 B2 | 2/2012 | Tanaka et al. | |
| 8,501,131 B2 | 8/2013 | Moyeda et al. | |
| 8,591,849 B2 | 11/2013 | Valentine et al. | |
| 8,815,197 B2 | 8/2014 | Broderick et al. | |
| 9,255,507 B2 | 2/2016 | Forwerck et al. | |
| 9,310,075 B2 | 4/2016 | Mikkulainen et al. | |
| 9,387,436 B2 | 7/2016 | Bruckner et al. | |
| 2001/0018033 A1 | 8/2001 | Wakasa et al. | |
| 2008/0202397 A1 | 8/2008 | Torbov | |
| 2008/0317652 A1 | 12/2008 | Bono et al. | |
| 2012/0177553 A1 | 7/2012 | Lindemann et al. | |
| 2012/0230898 A1* | 9/2012 | Yamaura ............ | B01D 53/8631 423/235 |
| 2013/0156671 A1* | 6/2013 | Moyeda ................ | B01D 53/56 423/235 |
| 2015/0064083 A1 | 3/2015 | Cohen et al. | |

OTHER PUBLICATIONS

R. F. MacDonald Co., "Supply and Install an SCR System to Operate with Existing HRSG," brochure (Mar. 15, 2016) 2 pages, http://rfmacdonald.com/casestudies/RFM-Ingredion-CornProducts.pdf.

R. F. MacDonald Co., "New Steam Plant with SCR Technology Provides Overall Processing Efficiency," brochure (Mar. 15. 2016) 2 pages, http://rfmacdonald.com/casestudies/RFM-TeasdaleFoods.pdf.

R. F. MacDonald Co., "Ultra Low NOx Case Studies," brochure (Feb. 23, 2015) pp. 1-2, http://www.rfmacdonald.com/lownox/casestudies.html.

R. F. MacDonald Co., "Ultra Low NOx Case Studies," brochure (Oct. 27, 2014) pp. 1-2, http://www.rfmacdonald.com/lownox/casestudies.html.

R. F. MacDonald Co., "Boiler Products Line Card," website (2020) pp. 1-2, https://www.rfmacdonald.com/products/boiler-types/.

R. F. Macdonald Co, "Option 5 PPM-Control NoX LAC/USC MED. CTR P&ID Urea UFCU System," drawing (Jun. 12, 2013) 4 pages, drawing No. 00352-178-3310.

R. F. MacDonald Co., "LAC/USC Heating Plant Upgrade." Power Point (Sep. 2013) 6 pages.

\* cited by examiner

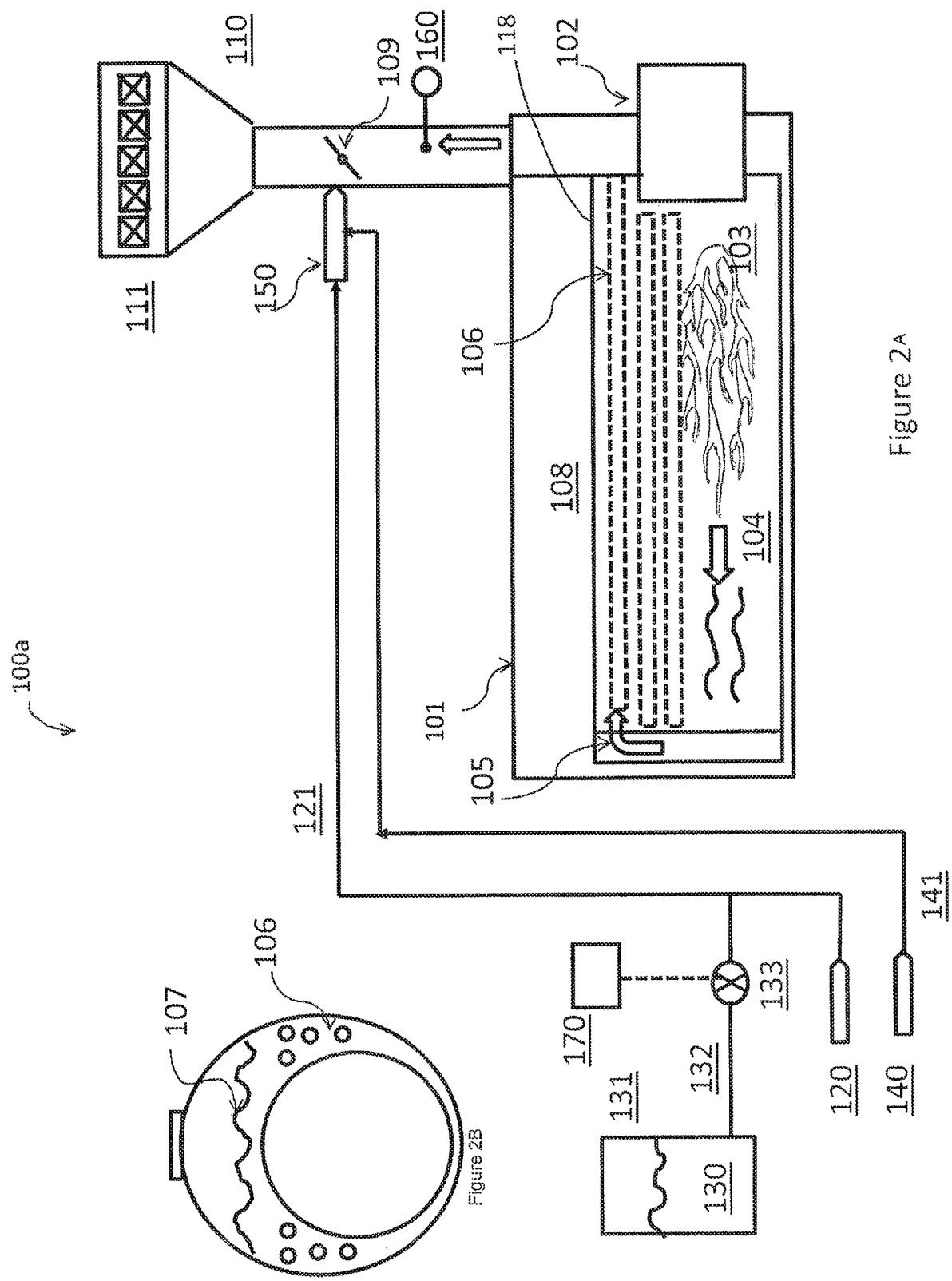

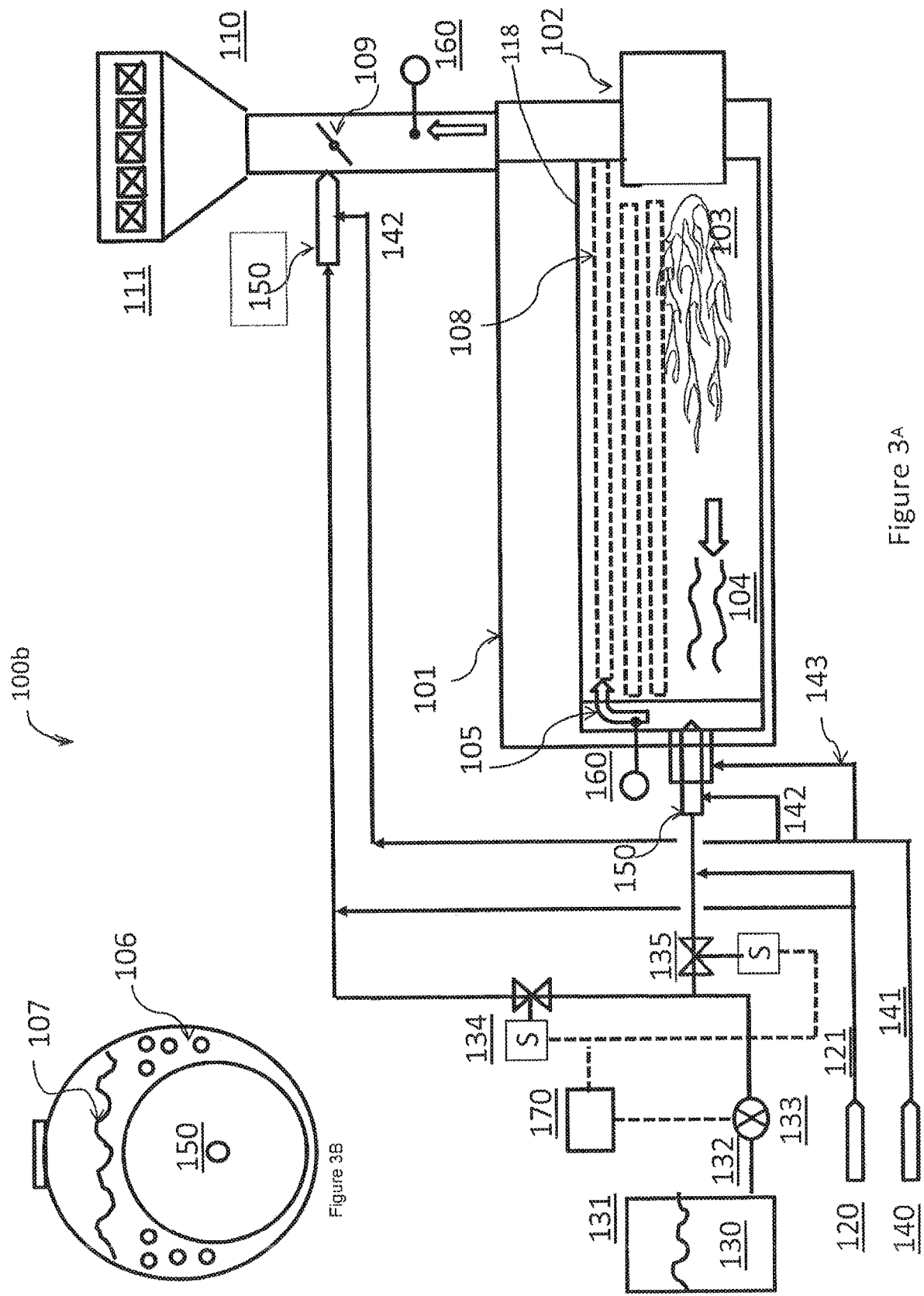

PROCESS FOR DIRECT UREA INJECTION WITH SELECTIVE CATALYTIC REDUCTION (SCR) FOR NOX REDUCTION IN HOT GAS STREAMS AND RELATED SYSTEMS AND ASSEMBLIES

FIELD OF THE INVENTION

The present invention relates, generally, to the field of $NO_x$ reduction. More particularly, the present invention relates to SCR for $NO_x$ reduction in boilers and other fired vessels.

BACKGROUND OF THE INVENTION

The ever-increasing emissions from combustion sources have led to increasing efforts to reduce fugitive emissions from these sources. Existing measures for $NO_x$ (nitrogen oxides) reduction in boilers include two-stage combustion, exhaust gas recirculation, rapid mix burners, high excess air with air/fuel pre-mixed and the like. In two-stage combustion, combustion air is supplied in two stages to the burner, where the fuel is burned with a smaller amount of air than necessary for complete combustion in the first stage, and the remaining amount of air necessary for complete combustion is supplied in the second stage, thereby lowering peak combustion temperatures and reducing $NO_x$ formation. In exhaust gas recirculation, exhaust gas generated by combustion is re-circulated so as to be mixed with the combustion air and fed to the burner, thereby also lowering peak combustion temperatures and reducing $NO_x$ formation. Rapid mix burners employ both exhaust gas recirculation (e.g., flue gas recirculation) and a rapid mix of fuel and air in the burner. The rapid mix promotes air/fuel distribution in the flame which reduces localized high temperatures in the flame which reduces $NO_x$ formation. Pre-mix burners mix fuel and air just prior to combustion to provide uniform air/fuel mixtures combined with high excess air to reduce $NO_x$ formation.

While these known methods have been effective at reducing $NO_x$ formation, the reduction has come at the cost of at least some reduction in boiler performance. For example, in at least some respects, boilers employing the above methods show a diminished response to load changes, an increase in the horsepower necessary for the combustion air fan motor to move the additional volumes of air, and an increase in operating costs due to an increased electrical energy demand.

Selective catalytic reduction (SCR), using post-combustion oxidation catalysts to reduce $NO_x$, has been an effective means for reducing $NO_x$ emissions without sacrificing boiler performance. In SCR, an ammonia source is required for the oxidation catalyst to remove $NO_x$ from the boiler flue gases. Anhydrous ammonia is the most readily usable source of ammonia in SCR applications. However, anhydrous ammonia poses significant safety hazards if the boiler system leaks or fails. Anhydrous ammonia has a health hazard rating of 3 on a scale of 0 to 4, with even short exposure capable of causing serious temporary or residual injury, even if prompt medical care is given. Eye wash stations, ambient ammonia sensors, and alarms are required to manage the health hazards of anhydrous ammonia. Moreover, many boiler installations are in hospitals, schools, prisons and universities where a large, and sometimes already susceptible or weak, population could be exposed to anhydrous ammonia during a leak or failure. This could be catastrophic.

Some boilers now employ aqueous methods of ammonia or reducing urea to ammonia to avoid some of the health risks associated with storing large amounts of anhydrous ammonia. Urea is particularly attractive to use in $No_x$ reduction systems as urea has a health hazard rating of 1 on a scale of 0 to 4, with short exposure potentially causing irritation but only minor residual injury even if no treatment is given. Boilers which incorporate methods of reducing urea to ammonia typically employ additional external heat sources and methods to convert urea to ammonia external to the boiler or through various ducts and side streams of flue gas before adding dilution air to the ammonia for delivery through an ammonia injection grid located upstream from the catalyst bed.

Delivering the oxidizing agent in these systems to the flue gas requires external ducting with heat tracing, insulation, hot gas fans, and other components. Failure of the heat tracing or insulation systems results in fouling of the delivery system causing unscheduled shut-down and maintenance. Moreover, these systems and added components increase the complexity and cost of boiler systems, increase the average maintenance costs of the boiler, and consume a larger amount of energy to deliver the oxidizing agent to the flue gas stream.

For at least these reasons, therefore, it would be advantageous if a new or improved method for SCR $NO_x$ reduction could be developed that addressed one or more of the above-described concerns, and/or other concerns. Particularly, it would be advantageous if a new or improved method for SCR $NO_x$ reduction could be provided for the low emission demands of the regulatory environment and the efficiency and performance demands for reduced energy costs, and without sacrificing safety.

SUMMARY OF THE INVENTION

In accordance with one embodiment, disclosed herein is a boiler or other fired vessel assembly.

In accordance with one embodiment, disclosed herein is a boiler or other fired vessel assembly comprising a housing comprising a burner at a first end, a furnace downstream of the burner, a convection section downstream of the furnace, and a flue gas outlet downstream of the convection section; a first means for loading a reducing agent into the housing, wherein the first means for loading the reducing agent is located downstream of the furnace and comprises at least two injectors; a second means for loading a reducing agent into the housing, wherein the second means for loading the reducing agent is located downstream of the first means for loading the reducing agent and comprises at least one injector; and a selective catalytic reduction (SCR) catalyst located either downstream of the second means for loading a reducing agent into the housing or adjacent the second means for loading a reducing agent into the housing such that the SCR catalyst is provided to the boiler approximately simultaneously with the reducing agent from the second means for loading the reducing agent into the housing.

In accordance with a further embodiment, disclosed herein is a boiler or other fired vessel assembly comprising a housing comprising a burner, an intermediate furnace, a convection section downstream from the intermediate furnace, and a flue gas outlet downstream of the convection section; a first means for loading a reducing agent into the housing, wherein the first means for loading the reducing agent is located downstream of the furnace and comprises at least two injectors; a second means for loading a reducing agent into the housing, wherein the second means for loading the reducing agent is located downstream of the first means for loading the reducing agent and comprises at least one injector; and a selective catalytic reduction (SCR) catalyst located either downstream of the second means for loading a reducing agent into the housing or adjacent the second means for loading a reducing agent into the housing such that the SCR catalyst is provided to the boiler approximately simultaneously with the reducing agent from the second means for loading the reducing agent into the housing.

In accordance with a further embodiment, disclosed herein is a method of reducing $NO_x$ in a boiler or other fired vessel which produces a direct flame.

In accordance with a further embodiment, disclosed herein is a method of reducing $NO_x$ in a boiler or other fired vessel which produces a direct flame, the method comprising providing (a) a first amount of a reducing agent to the boiler or other fired vessel at a first location downstream of the direct flame when a temperature of the first location is greater than or equal to a threshold temperature, or (b) a second amount of reducing agent to the boiler or other fired vessel at a second location downstream of the direct flame when a temperature of the first location is less than the threshold temperature, wherein the first location is downstream of the second location; and providing a selective catalytic reduction catalyst either downstream of or at generally the same location as second amount of a reducing agent, wherein the second amount of reducing agent is provided using at least two injectors.

In accordance with a further embodiment, disclosed herein is a method of retrofitting a boiler or other fired vessel the boiler or other fired vessel comprising a housing with a burner, an intermediate furnace, a convection section downstream of the furnace, and a flue gas outlet downstream of the convection section, with a $NO_x$ removal system.

In accordance with a further embodiment, disclosed herein is a method of retrofitting a boiler or other fired vessel, the boiler or other fired vessel comprising a housing with a burner, an intermediate furnace, a convection section downstream of the furnace, and a flue gas outlet downstream of the convection section, with a $NO_x$ removal system, the method comprising determining one or more parameters of the boiler or other fired vessel, wherein at least one of the one or more parameters is selected from the group consisting of internal shape of the boiler or other fired vessel, internal shape of the furnace, internal shape of the convection section, internal shape of the flue gas outlet, peak temperature of the furnace, peak temperature of the convection section, peak temperature of the flue gas outlet, operable temperature range of the furnace, operable temperature range of the convection section, operable temperature range of the flue gas outlet, concentration range of $NO_x$ formation, operable firing range, type of $NO_x$ compounds and concentration range of one or more types of $NO_x$ compounds, operating conditions causing peak $NO_x$ formation and combinations thereof; determining one or more parameters of a $NO_x$ removal system, wherein at least one of the one or more parameters is selected from the group consisting of SCR catalyst to be used, reducing agent to be used, number of reducing agent loading points, locations of reducing agent loading points, type of means for loading reducing agent, timing of reducing agent loading at each reducing agent loading point, concentration of reducing agent loading at each reducing agent loading point, spray pattern of the means for loading reducing agent at each reducing agent loading point, dilution or dilution range of the reducing agent, and combinations thereof; providing, based on the one or more parameters of the $NO_x$ removal system, a first means in communication with the housing for providing a reducing agent into the housing of the boiler or other fired vessel downstream of the furnace, wherein the first means comprises at least two injectors; providing, based on the one or more parameters of the $NO_x$ removal system, a second means in communication with the housing for providing a reducing agent into the housing of the boiler or other fired vessel downstream of the first means for providing reducing agent; and providing, based on the one or more parameters of the $NO_x$ removal system, a selective catalytic reduction catalyst downstream from or simultaneously with the second means for providing a reducing agent.

In accordance with a further embodiment, disclosed herein is a boiler assembly.

In accordance with a further embodiment, disclosed herein is a boiler assembly comprising a housing comprising a burner at a first end, a furnace downstream of the burner, a convection section downstream of the furnace, and a flue gas outlet downstream of the convection section; a first means for loading a reducing agent into the housing, wherein the first means for loading the reducing agent is located downstream of the furnace and comprises at least two injectors; a second means for loading a reducing agent into the housing, wherein the second means for loading the reducing agent is located downstream of the first means for loading the reducing agent and comprises at least one injector; and a selective catalytic reduction (SCR) catalyst located either downstream of the second means for loading a reducing agent into the housing or adjacent the second means for loading a reducing agent into the housing such that the SCR catalyst is provided to the boiler approximately simultaneously with the reducing agent from the second means for loading the reducing agent into the housing.

In accordance with a further embodiment, disclose herein is a boiler assembly comprising a housing comprising a burner, an intermediate furnace, a convection section downstream from the intermediate furnace, and a flue gas outlet downstream of the convection section; a first means for loading a reducing agent into the housing, wherein the first means for loading the reducing agent is located downstream of the furnace and comprises at least two injectors; a second means for loading a reducing agent into the housing, wherein the second means for loading the reducing agent is located downstream of the first means for loading the reducing agent and comprises at least one injector; and a selective catalytic reduction (SCR) catalyst located either downstream of the second means for loading a reducing agent into the housing or adjacent the second means for loading a reducing agent into the housing such that the SCR catalyst is provided to the boiler approximately simultaneously with the reducing agent from the second means for loading the reducing agent into the housing.

In accordance with a further embodiment, disclosed herein is a method of reducing $NO_x$ in a boiler which produces a direct flame.

In accordance with a further embodiment, disclosed herein is a method of reducing $NO_x$ in a boiler which produces a direct flame, the method comprising providing (a) a first amount of a reducing agent to the boiler at a first location downstream of the direct flame when a temperature of the first location is greater than or equal to a threshold temperature, or (b) a second amount of reducing agent to the boiler at a second location downstream of the direct flame when a temperature of the first location is less than the threshold temperature, wherein the first location is downstream of the second location; and providing a selective catalytic reduction catalyst either downstream of or at generally the same location as second amount of a reducing agent, wherein the first amount of reducing agent is provided using at least two injectors.

In accordance with a further embodiment, disclosed herein is a method of retrofitting a boiler, the boiler comprising a housing with a burner, an intermediate furnace, a convection section downstream of the furnace, and a flue gas outlet downstream of the convection section, with a $NO_x$ removal system.

In accordance with a further embodiment, disclosed herein is a method of retrofitting a boiler, the boiler comprising a housing with a burner, an intermediate furnace, a convection section downstream of the furnace, and a flue gas outlet downstream of the convection section, with a $NO_x$ removal system, the method comprising determining one or more parameters of the boiler, wherein at least one of the one or more parameters is selected from the group consisting of internal shape of the boiler or other fired vessel, internal shape of the furnace, internal shape of the convection section, internal shape of the flue gas outlet, peak temperature of the furnace, peak temperature of the convection section, peak temperature of the flue gas outlet, operable temperature range of the furnace, operable temperature range of the convection section, operable temperature range of the flue gas outlet, concentration range of $NO_x$ formation, operable firing range, type of $NO_x$ compounds and concentration range of one or more types of $NO_x$ compounds, operating conditions causing peak $NO_x$ formation and combinations thereof; determining one or more parameters of a $NO_x$ removal system, wherein at least one of the one or more parameters is selected from the group consisting of SCR catalyst to be used, reducing agent to be used, number of reducing agent loading points, locations of reducing agent loading points, type of means for loading reducing agent, timing of reducing agent loading at each reducing agent loading point, concentration of reducing agent loading at each reducing agent loading point, spray pattern of the means for loading reducing agent at each reducing agent loading point, dilution or dilution range of the reducing agent, and combinations thereof; providing, based on the one or more parameters of the $NO_x$ removal system, a first means in communication with the housing for providing a reducing agent into the housing of the boiler downstream of the furnace, wherein the first means comprises at least two injectors; providing, based on the one or more parameters of the $NO_x$ removal system, a second means in communication with the housing for providing a reducing agent into the housing of the boiler downstream of the first means for providing reducing agent; and providing, based on the one or more parameters of the $NO_x$ removal system, a selective catalytic reduction catalyst downstream from or simultaneously with the second means for providing a reducing agent.

BRIEF DESCRIPTION OF THE DRAWINGS

Features of the present disclosure which are believed to be novel are set forth with particularity in the appended claims. Embodiments of the disclosure are disclosed with reference to the accompanying drawings and are for illustrative purposes only. The disclosure is not limited in its application to the details of construction or the arrangement of the components illustrated in the drawings. The disclosure encompasses other embodiments and is capable of being practiced or carried out in other various ways. The drawings illustrate a best mode presently contemplated for carrying out the invention Like reference numerals are used to indicate like components. In the drawings:

FIG. 2A is a schematic cross-sectional view of an alternative $NO_x$ reduction system in use in a firetube boiler showing direct injection at the flue gas outlet in accordance with embodiments of the present disclosure;

FIG. 2B is a schematic rear view of the alternative $NO_x$ reduction system in use in a firetube boiler of FIG. 2A in accordance with embodiments of the present disclosure;

FIG. 3A is a schematic cross-sectional view of an alternative $NO_x$ reduction system in use in a firetube boiler showing direct injection at both the furnace and flue gas outlet in accordance with embodiments of the present disclosure; and FIG. 3B is a schematic rear view of the alternative $NO_x$ reduction system used in a firetube boiler of FIG. 3A in accordance with embodiments of the present disclosure.

DETAILED DESCRIPTION

Figures 1A, 1B:
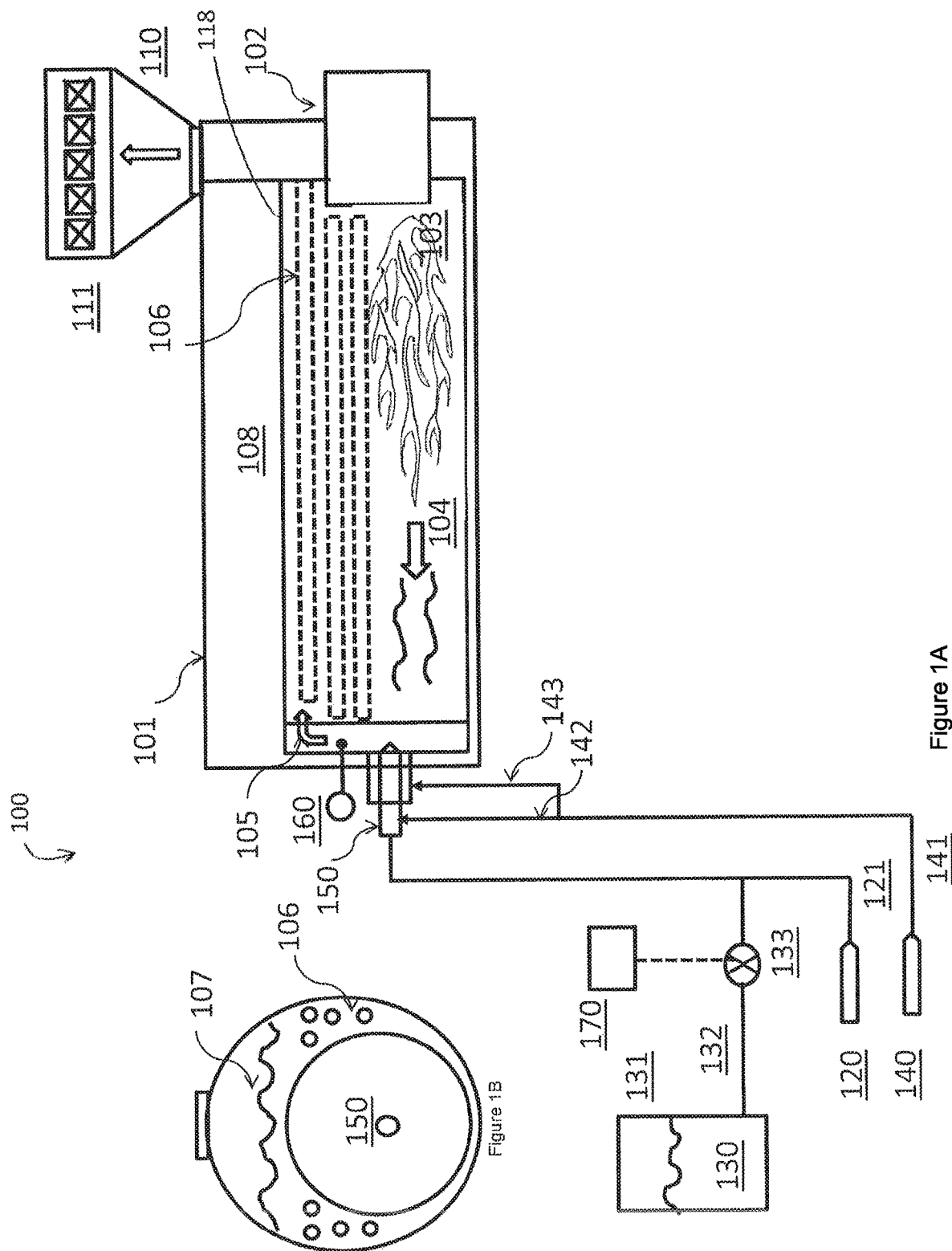
FIG. 1A is a schematic cross-sectional view of a $NO_x$ reduction system in use in a firetube boiler showing direct injection at the furnace in accordance with embodiments of the present disclosure.
FIG. 1B is a schematic rear view of the $NO_x$ reduction system in use in a firetube boiler of FIG. 1A in accordance with embodiments of the present disclosure.

In accordance with one embodiment, a $NO_x$ reduction system for use in a boiler or other fired vessel is disclosed. In an embodiment, a boiler or other fired vessel includes, but is not limited to, a gas and/or oil fired burner, a steam boiler with or without superheat, a hot water boiler or a thermal fluid heater of the firetube or watertube type.

FIGS. 1A-3 and 4-6 illustrate exemplary boiler configurations 101/101a wherein fuel and air are combusted by a burner 102 positioned near the front end of a furnace 118 to form a flame 103 and hot combustion gases (or exhaust gases) 104. The hot combustion gases 104 pass from the combustion chamber (where combustion occurs and the flame is located), to the convection section of the boiler where a fluid medium (e.g., water) is heated. The hot exhaust gases 104 continue through the convection section and are released through the flue gas outlet 110.

Figure 4:
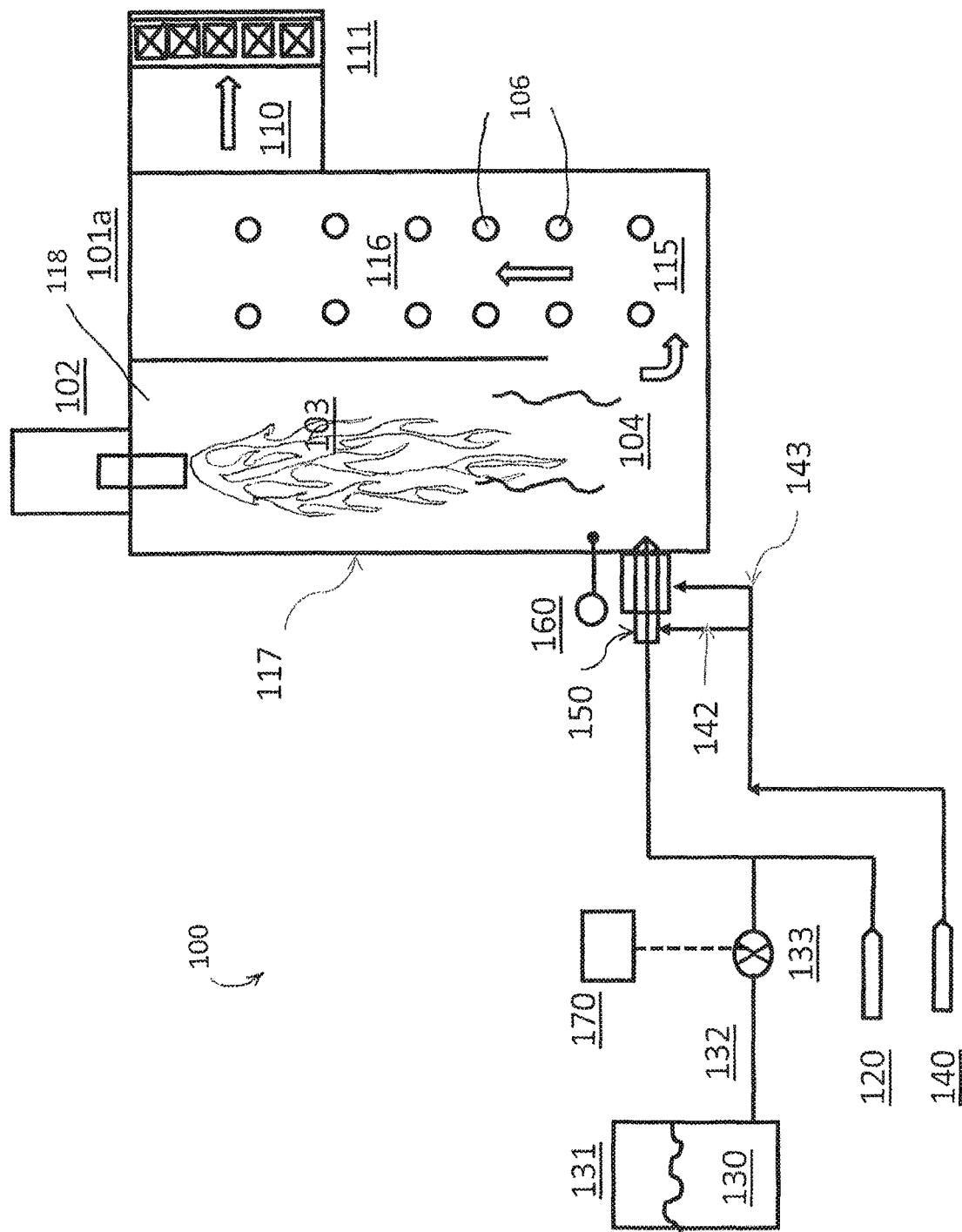
FIG. 4 is a schematic cross-sectional view of a $NO_x$ reduction system in use in a watertube boiler showing direct injection at the furnace in accordance with embodiments of the present.
Figure 5:
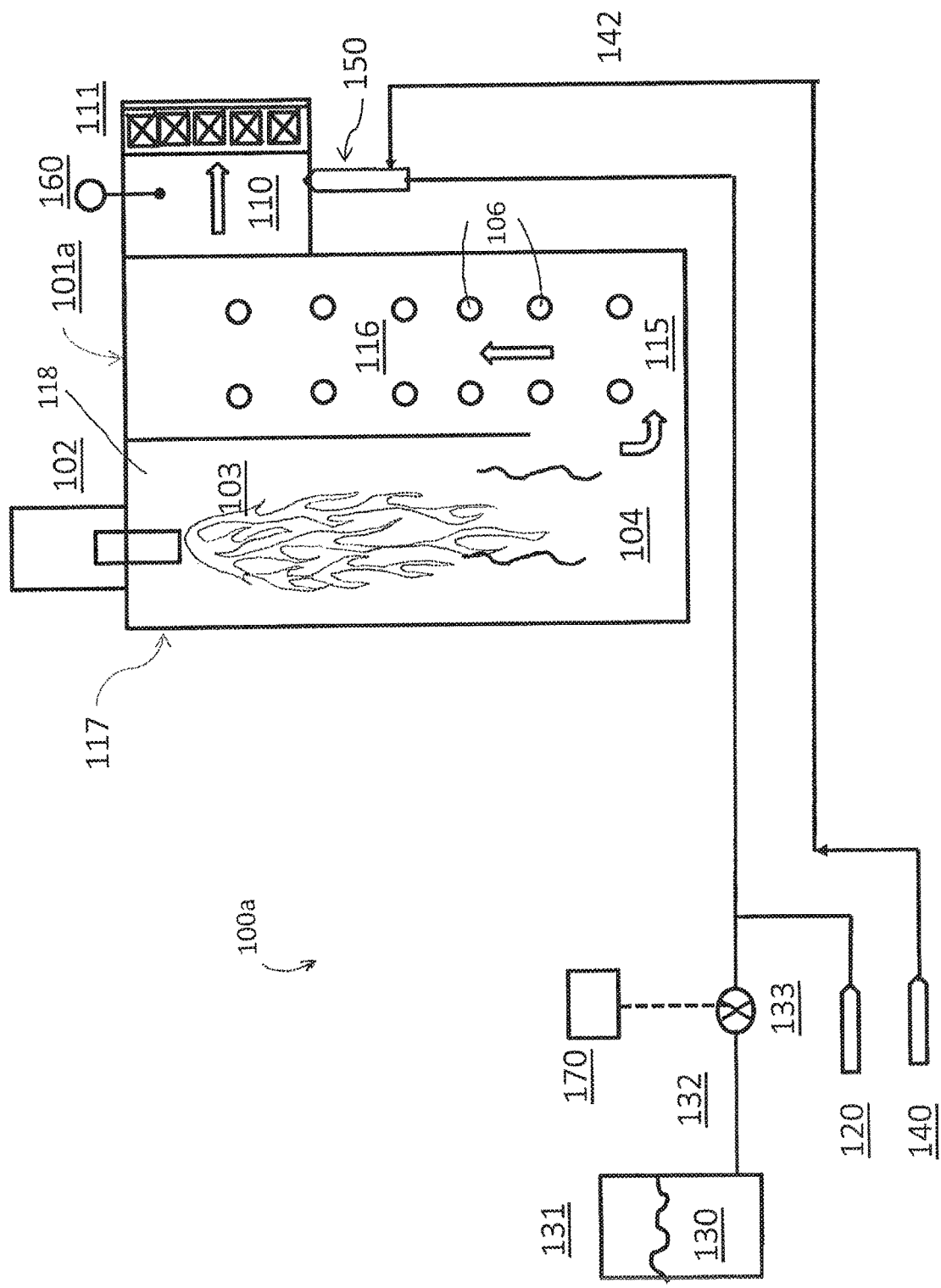
FIG. 5 is a schematic cross-sectional view of a further alternative $NO_x$ reduction system used a watertube boiler showing direct injection at the flue gas outlet in accordance with embodiments of the present disclosure.
Figure 6:
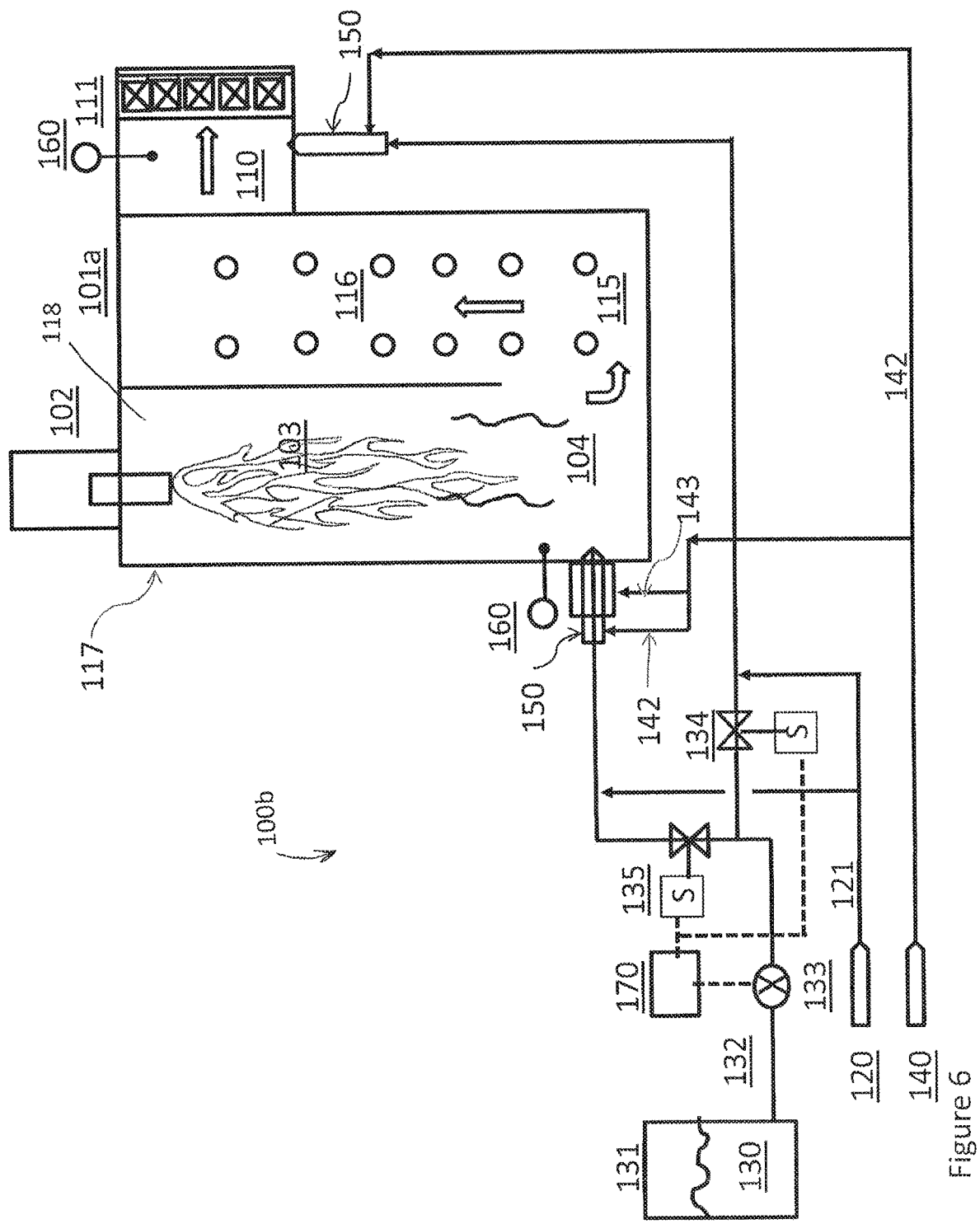
FIG. 6 is a schematic cross-sectional view of a further alternative $NO_x$ reduction system used in a watertube boiler showing direct injection at both the furnace and the flue gas outlet in accordance with embodiments of the present disclosure.

The boiler configurations 101/101a of FIGS. 1A-3B and 4-6, respectively, differ in that FIGS. 1A-3B illustrate a firetube boiler 101 while FIGS. 4-6 illustrate a watertube boiler 101a. As shown in FIGS. 1A-3B, the hot combustion gases 104 transition from the combustion chamber to the convection section via a rear turn around area 105. The hot combustion gases 104 are then directed through a plurality of convection tubes 106. Heat is transferred from the exhaust gases 104 to the surrounding medium 107 (typically a liquid such as water). Steam collects in the steam dome 108 and can be vented through a steam outlet (not shown). The cooling exhaust gases 104 are vented through the flue gas outlet 110. In an embodiment, the flue gas outlet 110 may be made of round outlet ducts or rectangular outlet ducts. In contrast, as shown in FIGS. 4-6, in a watertube boiler 101a, the hot combustion gases 104 travel to the end of the furnace 118 and enter the hot end of the convection zone 115. The hot, though starting to cool, combustion gases 104 continue to travel through the convection zone through which a number of convection tubes 106 pass, each convection tube 106 containing a medium to be heated (typically a liquid such as water). Heat from the exhaust gases 104 warms the liquid in the tubes 106, and any generated steam is released via a steam outlet (not shown). The cooling exhaust gases 104 are vented through the flue gas outlet 110.

In the embodiments shown, each boiler configuration 101/101a further includes a $NO_x$ removal system 100/100a/100b. In the embodiments shown, a $NO_x$ removal system 100/100a/100b includes a reducing agent 130, a means for loading the reducing agent 150 to the boiler configuration 101/101a at least one location located downstream of the flame 103, and a $NO_x$ removal catalyst (or SCR catalyst) 111.

In one embodiment, such as shown in FIGS. 1A, 2A, 4 and 5, a single means for loading the reducing agent 150 is provided at a single location downstream of the flame 103. Particularly, in FIGS. 1A and 4, the single means for loading the reducing agent 150 is positioned upstream of the convection section of the boiler configuration 101/101a, and in FIGS. 2A and 5, the single means for loading the reducing agent 150 is positioned at the flue gas outlet 110. More particularly, as shown in FIG. 1A, a single means for loading the reducing agent 150 is provided at the rear turn around space 105, while the single means for loading the reducing agent 150 for the embodiment shown in FIG. 4 is positioned at the point at which the hot combustion gases 104 enter the hot end of the convection area. Loading the reducing agent 130 at the point at which the hot combustion gases 104 enter the convection section causes the reducing agent to be loaded in cross-flow with the combustion gas stream, i.e., hot combustion gases 104.

In other embodiments, however, multiple means for loading the reducing agent 150 may be provided either at or about the same general location or, as show specifically in FIGS. 3A, 3B and 6, at different locations on a boiler configuration 101/101a, provided each of the means for loading the reducing agent 150 is downstream of the flame 103. In a preferred embodiment, a $NO_x$ removal system includes at least two means for loading the reducing agent 150, each provided at a different location on a boiler configuration 101/101a, and more preferably, a $NO_x$ removal system includes at least two means for loading the reducing agent 150, wherein a first of the at least two means for loading the reducing agent 150 is positioned at the convection section and a second of the at least two means for loading the reducing agent 150 is positioned at the flue gas outlet 110, as shown with respect to $NO_x$ removal systems 100b in FIGS. 3A, 3B and 6.

In an embodiment, a means for loading the reducing agent 150 can be any structure(s), device(s) or combination of structure(s) and/or device(s) capable of loading a reducing agent into the boiler configuration 101/101a at the location intended. For example, in the particular embodiments shown in FIGS. 1A-6, each means for loading the reducing agent 150 comprises one or more injectors. However, in further embodiments, the means for loading the reducing agent 150 may comprise, without limitation, one or more openings or inlets (e.g., to permit passage of a reducing agent), one or more nozzles, one or more injectors, one or more sprayers and/or any combination thereof.

In accordance with embodiments of the present disclosure, each means for loading the reducing agent 150 comprises one or more injectors, and more particularly, one or more lances with a hollow cone spray pattern. In a further embodiment, one or more of the means for loading the reducing agent 150 used in a $NO_x$ removal system 100/100a/100b comprises two or more injectors. More particularly, the means for loading the reducing agent 150 as shown in FIGS. 1A-6 each comprise one or more, preferably two or more, atomizing lances, each comprising one or more, preferably two or more, nozzle heads or jet nozzle head for releasing the reducing agent.

In embodiments in which the means for loading the reducing agent 150 includes one or more injectors, it will be understand that many types of injectors may be used. For example, injectors may be manually activated or automated, have different types of heads (e.g., nozzle, jet, etc.), have one or more nozzle or jet heads, have different spray patterns (e.g., narrow cone. wide cone, hollow cone, bent stream, split stream, etc.), and/or injectors that use pressure, air or water (e.g., steam) for atomization. Furthermore, in embodiments in which the means for loading the reducing agent 150 comprises two or more injectors, in an embodiment, each of the injectors may be the same, or the means for loading the reducing agent 150 may comprise two or more different injectors (e.g., injector types, spray patterns, jet heads, atomization means, etc.).

As will be appreciated, the specific location, configuration, and properties of the means for loading the reducing agent 150 used in a $NO_x$ removal system 100/100a/100b will vary depending on the particular boiler configuration 101/101a. For example, the reducing agent loading rate, location, structure and properties of the one or more means for loading the reducing agent 150, strength of spray, droplet size, and amount of carrier fluid, among others, are each specifically designed to achieve a desired efficiency and/or $NO_x$ level. Generally, however, by positioning the means for loading the reducing agent 150 downstream of the direct fire 103, and particularly at or around a convection section for the exhaust gas stream 104, or just downstream of the convection section, and/or at the flue gas outlet 110, and preferably at both the convection section and the flue gas outlet 110, a reduction in $NO_x$ can be achieved with little if any adverse effect on combustion in the burner or the heat transfer in the heat transfer tubes (whether fire or watertubes). Further, by positioning the means for loading the reducing agent 150 downstream of the direct fire 103, and particularly at or around a turn-around location for the exhaust gas stream 104 and/or at the flue gas outlet 110, preferably at both the convection section and the flue gas outlet 110, minimal modifications are required to the boiler configuration 101/101a and the system 100/100a/100b can be readily fitted to existing boilers or other fired vessels.

In an embodiment, the reducing agent 130 may be any reducing agent known in the art, including, for example, aqueous ammonia, aqueous urea, or urea; however, in a preferred embodiment, the reducing agent is aqueous urea or aqueous ammonia.

In the embodiment shown, the reducing agent 130 is stored in a tank 131 which is fed to the loading means 150 via line 132.

In an embodiment, the reducing agent 130 may be mixed with a carrier fluid, such as water, after storage in the tank 131 but prior to being loaded into the boiler configuration 101/101a. In a preferred embodiment, the carrier fluid (e.g., water) is mixed with the reducing agent on demand (i.e., the reducing agent and carrier fluid are not pre-mixed or stored as a carrier fluid/reducing agent mixture).

In particular, and with reference to the Figures, a carrier fluid supply 120 (e.g., water supply) connects directly to the means for loading the reducing agent 150 via line 121

Mixing the reducing agent 130 with a carrier fluid dilutes the reducing agent. The reducing agent 130 decomposes prior to reacting in the boiler configuration 101/101a; but typically, it is desirable to have the reducing agent 130 decompose at a strategic location in the boiler configuration 101/101a which may not necessarily be the immediate loading site. The carrier fluid protects the reducing agent 130 until it can reach a desired location, typically of a slightly lower temperature at which the necessary reaction with $NO_x$ and/or the SCR catalyst can occur.

The exact dilution amount varies based on the specifics of the means for loading the reducing agent (e.g., location, type, etc.) and other factors relating to the boiler configuration 101/101a, including, for example, size of the boiler, volume of range of reducing agent that may be injected, type of boiler, etc. The dilution amount is particularly important when the reducing agent 130 loaded depends on the temperature in the loading location and/or amount of $NO_x$ formation. For example, when the reducing agent is provided downstream of the furnace and at or around a convection section, typically a maximum 10% dilution (90% carrier fluid, 10% reducing agent) is used due to the higher temperatures experienced relative to other downstream locations. In contrast, a maximum 20% dilution (80% carrier fluid, 20% reducing agent) is used when the reducing agent is provided downstream of the convection section and/or at or around the flue gas outlet 110.

Mixing the reducing agent 130 with a carrier fluid not only dilutes the reducing agent, but also influences the spray pattern of injection (e.g., promotes atomization). For example, as discussed further below, the amount of reducing agent 130 provided at any given point (via a given means for providing the reducing agent 150) may vary. The carrier fluid can be used to make up volume if the amount of reducing agent 130 injected is less than the maximum, resulting in maintaining a consistent spray pattern even when the amount of actual reducing agent is decreased.

In accordance with some embodiments of the present disclosure, carrier fluid (e.g., water) alone is provided to the boiler/fired vessel via the means for loading the reducing agent 150 in order to keep the loading means clean and/or cool.

The flow rate/loading rate of the reducing agent also varies based on the boiler/fired vessel parameters and the location of the specific means for loading the reducing agent 150. For example, generally the flow rate of the reducing agent when provided downstream of the direct fire 103 and at or around a convection section is from 2 to 5 times greater than the maximum calculated flow rate based on an assumption of 100% efficiency to account for loss of reducing agent due to the degradation of the reducing agent at high temperatures. The flow rate of the reducing agent when provided downstream of the convection section and/or at or around the flue gas outlet 110 is less that that required at or around the convection section due to lower temperatures; however, the flow rate of the reducing agent downstream of the convection section and/or at or around the flue gas outlet 110 is still greater than the calculated maximum based on an assumption of 100% efficiency.

In some embodiments, and as shown in FIGS. 1A-6, a metering pump 133 controls the amount, flow rate and timing of reducing agent 130 provided to the means for loading the reducing agent 150. Depending on the design of the means for loading the reducing agent 150 (e.g., in embodiments in which the means for loading the reducing agent 150 is one or more injectors), a metering pump 133 may also control the means for loading the reducing agent 150.

In an embodiment, a control panel 170 may be used to program or otherwise control the metering pump 133. For example, in some embodiments, the control panel 170 may be in communication with at least one sensor configured to detect one or more properties of the boiler/fired vessel and activate/deactivate the metering pump 133 in response to the detected property(ies). For example, the control panel 170 may be in communication with one or more sensors configured to detect temperature at one or more locations, $NO_x$ concentration at one or more locations, firing rate, and combinations of these and other properties. In some embodiments, particularly one more than one loading means 150 is provided, more than one sensor may be provided, with each sensor in communication with a control panel 170. In some embodiments, each sensor is in communication with the same (e.g., master) control panel 170, while in other embodiments, designated control panels may be provide for each sensor and, ultimately, loading means. The control panel 170 may then be configured to control the loading of the reducing agent based on input from the sensor(s).

For example, and as shown in the embodiments in the Figures, the control panel 170 is in communication with at least one temperature sensor 160, with the temperature sensor 160 located approximately adjacent the means for loading the reducing agent 150. In embodiments in which two or more loading means 150 are provided, as shown in FIGS. 3A and 6, a temperature sensor 160 may be provided approximately adjacent each loading means 150. In response to input from the temperature sensor 160, the control panel 170 causes the means for loading the reducing agent 130 to load an amount of reducing agent 130 into the system 100/100a/100b.

It will therefore be appreciated that the location of the temperature sensor(s) 160 may therefore change based on the location of the means for loading the reducing agent 150. For example, as shown in FIGS. 1A, 1B, and 4, the reducing agent 130 is loaded into the rear of the boiler configuration 101/101a. The temperature sensor 160 is therefore located at the rear or bottom of the boiler configuration 101/101a in proximity to the means for loading the reducing agent 150. As shown in FIGS. 2A and 5, however, the temperature sensor 160 is located in the flue gas outlet 110 because the reducing agent 130 is loaded into the flue gas outlet 110. Further, as shown in FIGS. 3 and 6, multiple temperature sensors 160 may be provided so that each means for loading the reducing agent 150 includes a corresponding temperature sensor 160 for its specific loading location. Other locations of the temperature sensor 160 are contemplated based on the location of the means for loading the reducing agent 150.

In particularly, and with reference to the embodiments shown in which the reducing agent, preferably urea, is loaded at two locations, e.g., as shown in FIGS. 3A and 6, the temperature sensor(s) 160 are in communication with the control panel 170, which controls the activation of each of the injectors at the means for loading the reducing agent 150. Further, and with particular reference to the embodiments shown in FIGS. 3A and 6, the control panel 170 is in communication with urea shut off values 134, 135 on the urea lines 132 to a means for loading the reducing agent 150 either at the flue gas outlet 110 or downstream of the main flame 103 but before the flue gas outlet 110. In an embodiment, the urea shut off values may be solenoids.

The control panel 170 is configured to cause reducing agent 130 to be provided to the system 100/100a/100b at temperatures greater than or equal to 425° F., as measured by the temperature sensors 160 located near the respective means for loading the reducing agent 150. More particularly, in the embodiments shown in FIGS. 3A and 6, the control panel 170 is configured to cause reducing agent 130 to be preferably provided to the system 100b at the flue gas outlet 110 when the temperature read by the temperature sensor 160 at the flue gas outlet 110 is greater than 425° F. In an embodiment, when the temperature read by the temperature sensor 160 at the flue gas outlet 110 is greater than 425° F., the control panel 170 will cause reducing agent 130 to be provided to the system 100b primarily at the flue gas outlet 110 (e.g., a majority of the reducing agent 130 provided to the system 100b is provided at the flue gas outlet 110). In other embodiments, when the temperature read by the temperature sensor 160 at the flue gas outlet 110 is greater than 425° F., the reducing agent 130 may be provided to the system 100b solely at the flue gas outlet 110.

As the temperature read by the temperature sensor 160 at the flue gas outlet 110 reaches 425° F. or less, the control control scheme switches from loading the reducing agent at the flue gas outlet 110 to loading the reducing agent at the convection section. In an embodiment, when the temperature read by the temperature sensor 160 at the flue gas outlet 110 is less than 425° F., the control panel 170 causes the reducing agent 130 to be provided primarily at the convection section of the boiler or other fired vessel (e.g., a majority of the reducing agent 130 is provided to the system 100b at the convection section). In other embodiments, when the temperature read by the temperature sensor 160 at the flue gas outlet 110 is less than 425° F., the reducing agent 130 may be provided to the system 100b solely at the convection section.

A temperature drop, such as to a temperature of less than 425° F., usually occurs as the boiler's firing rate decreases or the demand decreases. As the temperature drops significantly below 425° F., there is a concern that the reducing agent (e.g., urea) will not completely decompose if loaded to the flue gas outlet 110 as it passes through the SCR catalyst.

On the other end of the spectrum, typically the maximum temperature at which a reducing agent is loaded into the system 100/100a/100b is 2,200° F. In an embodiment, the control panel 170 is configure to stop the loading of the reducing agent to the system 100/100a/100b if the temperature obtained by the sensor 160 is greater than 2,200° F. At temperatures greater than 2,200° F., there is concern that the reducing agent, e.g., urea, may react with $O_2$ and form additional $NO_x$.

In other embodiments, the control panel may cause all reducing agent 130 to be provided at one strategic location (e.g., the furthest downstream location or location closest to the SCR catalyst), provided the temperature at that location remains within an operable range (e.g., less than 2,200° F. and greater than 425° F.).

Preferably, the working loading temperature range for a given boiler configuration 101/101a is from 1,000° F. to 2,200° F. It will be understood, however, that the workable and/or operable temperature range for a given system 100/100a/100b may vary depending on the specific reducing agent used.

In other embodiments, other sensors are used to monitor the overall function of the boiler/fired vessel 101/101a. The control panel 170 receives feedback from the sensors and determines whether adjustment to the loading of the reducing agent is necessary. For example, a $NO_x$ sensor may be provided at the flue gas outlet 110 for the purpose of determining the overall $NO_x$ concentration being released from the system 100/100a/100b. If the total $NO_x$ is above a desired amount (e.g., a compliance or other regulatory amount), the control panel may adjust the timing urea flow rate, concentration, dilution or one or more of these and other factors of the system 100/100a/100b to bring the amount of $NO_x$ into acceptable limits.

In some embodiments, the means for loading the reducing agent 150 is also connected to an air supply 140 via lines 141. As shown in FIGS. 1A, 3A and 4, in some embodiments, the air supply 140 connects both directly to the means for loading the reducing agent 150, e.g., via line 142, to atomize the reducing agent/water mixture and to a covering around the means for loading the reducing agent 150, e.g., via line 143, to cool the means for loading the reducing agent 150 as needed. However, as shown in FIGS. 2A, 5 and 6, in some embodiments, the loading means 150 may not include a covering around the means for loading the reducing agent 150 or may otherwise not require cooling. In such instances, the air supply 140 is connected to the means for loading the reducing agent 150 via line 142 to atomize the reducing agent water mixture. In one embodiment, the air supplied directly to the means for loading the reducing agent 150 for atomization via line 142 is a constant stream. In further embodiments, however, the air supplied directly to the means for loading the reducing agent 150 for atomization may vary based on the total loading volume, conditions in the boiler configuration 101/101a/101b or $NO_x$ removal system 100/100a/100b, and/or the particular boiler configuration 101/101a or system 100/100a/100b. In any event, the amount of air provided by line 142 must be sufficient for proper reducing agent atomization.

In some embodiments, the air supplied for cooling the loading means 150 via line 143 is a constant stream. In other embodiments, however, the air supplied to the means for loading the reducing agent 150 via line 143 may vary based on the temperature of the boiler configuration 101/101a, the temperature at the exit of the nozzles of the means for loading the reducing agent 150, the conditions necessary to achieve proper atomization of the reducing agent, and/or the temperature necessary to prevent destruction of the reducing agent.

In an embodiment, the SCR catalyst 111 may be any SCR catalyst known in the art, including, for example, and without limitation, those made from a ceramic carrier (e.g., titanium oxide) with an oxide of a base metal (e.g., vanadium, molybdenum, tungsten, etc.), zeolite, or precious metal. In some embodiments, the catalytic components (e.g., carrier and the oxide of base metal, zeolite or precious metal) may be packaged together on a structure such as a fiberglass structure. An exemplary preferred catalyst is the DNX series (available from Haldor Topsoe) which is a corrugated monolith based on a glass fiber structure.

In an embodiment, the $NO_x$ removal catalyst is then provided either simultaneously with the reducing agent at one location or downstream from the reducing agent. Preferably, and in embodiments in which the reducing agent is provided at two or more locations, the $NO_x$ removal catalyst is provided downstream of the last of the two or more locations at which the reducing agent is provided or simultaneously with the reducing agent at the last location that the reducing agent is provided.

Particularly, in the embodiments shown in FIGS. 1A, 2A, 3A and 4-6, the SCR catalyst 111 is provided at the flue gas outlet 110 such that the combustion gases 104 pass through the structure on which the catalyst 111 is contained. The SCR catalyst 111 accelerates the reductive reaction of the $NO_x$ with the reducing agent 130. Therefore, the reducing agent 130 and the combustion gas 104 are mixed together at or near the flue gas outlet 110 or in a passage of the exhaust gas 104 to the flue gas outlet 110.

In a further embodiment, such as shown with reference to FIG. 2A, a baffle plate or mixing plate 109 may be used to promote mixing of the reducing agent 130 (or reducing agent/water mixture) with the $NO_x$ removal catalyst 111. In the exemplary embodiment shown, the mixing plate 109 is provided in the passage of the flue gas outlet 110. While a mixing plate 109 may be provided at the flue gas outlet 110 regardless of the location of the means for loading the reducing agent 150, it will be understood that the utility of the mixing plate 109 is most important when the means for loading the reducing agent 150 is provided at the flue gas outlet 110.

As shown in FIGS. 2A and 5, in such an embodiment as when the means for loading the reducing agent 150 is provided at the flue gas outlet 110, the mixing plate 109 is provided at a location just above (e.g., downstream) from the means for loading the reducing agent 150. This positioning ensures that the reducing agent 130 (or reducing agent/water mixture) is received in the flue gas outlet 110 before encountering the mixing plate 109.

One skilled in the art will understand that the functionality of a mixing plate 109 as described above can be maximized when the flue gas outlet 110 is made of round outlet ducts. In embodiments in which the outlet ducts are rectangular, enhanced mixing of the reducing agent (or reducing agent/water mixture) may be best provided by using multiple means for loading the reducing agent 150 or a means for loading the reducing agent 150 with multiple outlets/nozzles.

In accordance with one embodiment, a method of $NO_x$ removal for use with a boiler or other fired vessel is disclosed.

In an embodiment, the method includes providing a reducing agent to a boiler or other fired vessel downstream of the direct fire and providing a selective catalytic reduction catalyst downstream from the reducing agent. In an embodiment, the boiler or other fired vessel is any boiler or other fired vessel as disclosed herein. In a further embodiment, the boiler or other fired vessel is selected from the group consisting of a firetube boiler and a watertube boiler.

In a further embodiment, the reducing agent is provided to the boiler or other fired vessel at or around the location at which the exhaust gases turn to a convection area of the boiler or other fired vessel or in the exhaust gas stream. In a further embodiment in which the boiler or other fired vessel is a firetube boiler, the reducing agent is provided to the boiler at the rear turn around space. In a further embodiment in which the boiler or other fired vessel is a watertube boiler, the reducing agent is provided at the point at which the exhaust gases turn to enter the hot end of the convection zone. In a further embodiment, the reducing agent is provided to the boiler or other fired vessel at the flue gas outlet.

In one embodiment, the step of providing a reducing agent to a boiler or other fired vessel comprises injecting the reducing agent. In another embodiment, the boiler or other fired vessel is a boiler and the reducing agent is injected downstream of the direct fire. In a further embodiment, the boiler or other fired vessel is a firetube or watertube boiler and the reducing agent is injected downstream of the direct fire. In a further embodiment, the boiler or other fired vessel is a firetube boiler and the reducing agent is injected at the rear turn around space or the flue gas outlet. In a further embodiment, the boiler or other fired vessel is a watertube boiler and the reducing agent is injected at the point at which the exhaust gases turn to enter the hot end of the convection zone or the flue gas outlet.

In a further embodiment, the step of providing a reducing agent to a boiler or other fired vessel includes injecting and atomizing the reducing agent.

In an embodiment, the step of providing a reducing agent to a boiler or other fired vessel comprises controlling the amount of reducing agent provided and when the reducing agent is provided. In one embodiment, the step of controlling the amount of reducing agent provided and when the reducing agent is provided includes monitoring the temperature of the boiler at the point at which the reducing agent is provided and providing the reducing agent only when the temperature is within an operable range as determined by the particular reducing agent and/or SCR catalyst used. In an embodiment, the reducing agent is urea and the temperature is within a range sufficient to convert the urea to ammonia.

In an embodiment, the method further includes mixing the reducing agent with water prior to providing the reducing agent to a boiler or other fired vessel. In an embodiment, the mixing the reducing agent with water occurs in the providing means.

In an embodiment, the method further includes mixing the reducing agent with the exhaust gas stream. In an embodiment, the method includes providing or injecting the reducing agent at the flue gas outlet of the boiler or other fired vessel and mixing the reducing agent with the flue gas.

In one embodiment, the reducing agent is aqueous urea.

In an embodiment, the step of providing a selective catalytic reduction catalyst downstream from the reducing agent comprises providing the selective catalytic reduction catalyst at the flue gas outlet.

In accordance with one embodiment, a method of retrofitting a boiler or other fired vessel with a $NO_x$ removal system is disclosed. In an embodiment, the boiler or other fired vessel comprises a housing with a furnace and burner at one end, a convection section at the other end of the housing, and a flue gas outlet at the end of the convection section. In a further embodiment, the boiler or other fired vessel is selected from the group consisting of a gas and/or oil fired burner, a steam boiler with or without superheat, a hot water boiler, and a thermal fluid heater of the firetube or watertube variety. Preferably, the boiler or other fired vessel is a firetube boiler or a watertube boiler.

The method next includes determining one or more parameters of the existing boiler or other fired vessel, and preferably determining at least two, or at least three, or at least four parameters of the existing boiler or other fired vessel. Exemplary parameters include, but are not limited to, internal shape of the furnace, internal shape of the convection section, internal shape of the flue gas outlet, peak temperature at the furnace, peak temperature at the convection section, peak temperature at the flue gas outlet, operable temperature range at the furnace, operable temperature range at the convection section, operable temperature range at the flue gas outlet, concentration range of $NO_x$ formation, operable firing range, type of $NO_x$ compounds formed and amounts of each kind/class, operating conditions causing peak $NO_x$ formation, expected $NO_x$ reductions, emissions requirements and combinations of these and other parameters.

In an embodiment, the step of determining one or more parameters of the existing boiler or other fired vessel includes determining at least one of the peak temperatures at the convection section and operable temperature range at the flue gas outlet. In an embodiment, the step of determining one or more parameters of the existing boiler or other fired vessel includes determining preferably at least both the peak temperature at the convection section and operable temperature range at the flue gas outlet. The parameter of the peak temperature of the convection section will help determine whether a reducing agent may be loaded to the convection section and, if so, at what conditions. The parameter of the operable temperature range of the flue gas outlet will help determine whether a reducing agent may be loaded to the flue gas outlet and, if so, at what conditions.

The method next includes determining, based on the one or more parameters of the existing boiler or other fired vessel, at least one, preferably two or more, more preferably three or more, and more preferably four or more parameters for a $NO_x$ removal system. Such parameters include, for example, but are not limited to, reducing agent(s) to be used, SCR catalyst(s) to be used, reducing agent loading point(s) (including how the mixing length of the flue gas outlet between any potential reducing agent loading sites and the location of the SCR catalyst(s)), reducing agent loading time(s) (e.g., based on one or more temperatures, $NO_x$ formation, operating conditions of the boiler/fired vessel, etc.), type of means for loading the reducing agent, spray pattern of the means for loading the reducing agent, dilution or dilution range for loading the reducing agent, and combinations of these and other parameters.

In an embodiment, the step of determining, based on the one or more parameters of the existing boiler or other fired vessel, at least one parameter for a $NO_x$ removal system includes determining at least one of the dilution or dilution range of the reducing agent, the spray pattern of any one or more means for loading the reducing agent, and the reducing agent to be used at the flue gas outlet. Preferably the step of determining, based on the one or more parameters of the existing boiler or other fired vessel, at least one parameter for a $NO_x$ removal system includes at least two, or more preferably all three of determining at least one of the dilution or dilution range of the reducing agent, the spray pattern of any one or more means for loading the reducing agent, and the reducing agent to be used at the flue gas outlet.

In embodiments in which more than one means for loading a reducing agent will be used in a $NO_x$ removal system, and particularly in embodiments in which at least two of the more than one means for loading a reducing agent will be located at different positions of the boiler or other fired vessel, the step of determining, based on the one or more parameters of the existing boiler or other fired vessel, at least one parameter for a $NO_x$ removal system includes at least one of determining the dilution or dilution range of the reducing agent to be loaded at a first location in the boiler or other fired vessel, determining the dilution or dilution range or the reducing agent to be loaded at a second location in the boiler or other fired vessel, determining the spray pattern of at least one of the more than one means for loading the reducing agent, and the reducing agent to be used with at least one of the more than one means for loading the reducing agent.

In an embodiment, the method further includes providing at least one providing means in communication with the housing for providing a reducing agent in the housing of the boiler or other fired vessel in accordance with the one or more parameters of the existing boiler or other fired vessel determined in the previous step.

In a particular embodiment, the method includes providing a first at least one means in communication with the housing for providing a reducing agent in the housing of the boiler or other fired vessel downstream of the furnace and upstream of the flue gas outlet and providing a second at least one means in communication with the housing for providing a reducing agent in the housing of the boiler or other fired vessel downstream of the first at least one means for providing a reducing agent. Preferably, the first means in communication with the housing for providing a reducing agent comprises at least two injectors and is located at the convection section of the boiler and the second means in communication with the housing for providing a reducing agent is located at the flue gas outlet.

In an embodiment, the method further includes introducing a selective catalytic reduction (SCR) catalyst at the flue gas outlet of the boiler or other fired vessel in accordance with the one or more parameters of the existing boiler or other fired vessel determined in a previous step.

In still further embodiments, the method further includes providing at least one additional component as necessary to control the providing of a reducing agent and/or SCR catalyst based on the parameters for the $NO_x$ removal system determined earlier, wherein the at least one additional component is selected from the group consisting of a temperature sensor in communication with the housing, a metering pump in communication with the at least one providing means, a control panel in communicating with the at least one providing means and/or the metering pump, a water source connected to the at least one providing means, and an air source connected to the at least one providing means.

The following embodiments are provided as specific support and/or enablement for the appended claims. Accordingly, the present disclosure provides:

E1. A boiler or other fired vessel assembly comprising a housing comprising a burner at a first end, a furnace downstream of the burner, a convection section downstream of the furnace, and a flue gas outlet downstream of the convection section; a first means for loading a reducing agent into the housing, wherein the first means for loading the reducing agent is located downstream of the furnace and comprises at least two injectors; a second means for loading a reducing agent into the housing, wherein the second means for loading the reducing agent is located downstream of the first means for loading the reducing agent and comprises at least one injector; and a selective catalytic reduction (SCR) catalyst located either downstream of the second means for loading a reducing agent into the housing or adjacent the second means for loading a reducing agent into the housing such that the SCR catalyst is provided to the boiler or other fired vessel approximately simultaneously with the reducing agent from the second means for loading the reducing agent into the housing.

E2. The assembly of E1, wherein the second means for loading the reducing agent comprises at least two injectors.

E3. The assembly of any of E1-E2, wherein the first means for loading a reducing agent is located at the convection section.

E4. The assembly of any of E1-E3, wherein the second means for loading a reducing agent is located at the flue gas outlet.

E5. The assembly of any of E1-E4, wherein the SCR catalyst is located at the flue gas outlet.

E6. The assembly of any of E1-E5, further including a mixing element at the flue gas outlet downstream of the second means for loading a reducing agent.

E7. The assembly of any of E1-E6, further comprising a metering pump in communication with at least one of the first or second means for loading a reducing agent.

E8. The assembly of any of E1-E7, further comprising a temperature sensor proximal to at least one of the first or second means for loading a reducing agent.

E9. The assembly of any of E1-E8, further including a storage tank comprising the reducing agent and connected to at least one of the first or second means for loading a reducing agent.

E10. The assembly of any of E1-E9, further including a water supply connected to at least one of the first or second means for loading a reducing agent.

E11. The assembly of any of E1-E10, further including an air supply connected to at least one of the first or second means for loading a reducing agent.

E12. The assembly of any of E1-E11, wherein the reducing agent is aqueous ammonia or aqueous urea.

E13. The assembly of any of E1-E12, wherein the boiler or other fired vessel is a boiler.

E14. The assembly of E13, wherein the boiler is a firetube boiler or a watertube boiler.

E15. A boiler or other fired vessel assembly comprising a housing comprising a burner, an intermediate furnace, a convection section downstream from the intermediate furnace, and a flue gas outlet downstream of the convection section; a first means for loading a reducing agent into the housing, wherein the first means for loading the reducing agent is located downstream of the furnace and comprises at least two injectors; a second means for loading a reducing agent into the housing, wherein the second means for loading the reducing agent is located downstream of the first means for loading the reducing agent and comprises at least one injector; and a selective catalytic reduction (SCR) catalyst located either downstream of the second means for loading a reducing agent into the housing or adjacent the second means for loading a reducing agent into the housing such that the SCR catalyst is provided to the boiler approximately simultaneously with the reducing agent from the second means for loading the reducing agent into the housing.

E16. The assembly of E15, wherein the boiler or other fired vessel is a boiler.

E17. The assembly of E16, wherein the boiler is a firetube boiler or a watertube boiler.

E18. A method of reducing $NO_x$ in a boiler or other fired vessel which produces a direct flame, the method comprising: providing (a) a first amount of a reducing agent to the boiler or other fired vessel at a first location downstream of the direct flame when a temperature of the first location is greater than or equal to a threshold temperature, or (b) a second amount of reducing agent to the boiler or other fired vessel at a second location downstream of the direct flame when a temperature of the first location is less than the threshold temperature, wherein the first location is downstream of the second location; and providing a selective catalytic reduction catalyst either downstream of or at generally the same location as second amount of a reducing agent, wherein the second amount of reducing agent is provided using at least two injectors.

E19. The method of E18, wherein the boiler or other fired vessel comprises a housing with a burner and furnace at one end, a convection section at a second end, and the flue gas outlet at the end of the convection section and wherein the step of providing a second amount of a reducing agent includes providing the reducing agent to the convection section, the step of providing a first amount of reducing agent includes providing the reducing agent to the flue gas outlet, and the step of providing a selective catalytic reduction catalyst includes providing the selective catalytic reduction catalyst to the flue gas outlet.

E20. The method of any of E18-E19, wherein the threshold temperature is 425° F.

E21. The method of claim any of E18-E20, further comprising the step of mixing the reducing agent with a carrier fluid before providing the first amount or second amount of the reducing agent.

E22. The method of any of E18-E21, wherein the boiler or other fired vessel is a boiler.

E23. The method of E22, wherein the boiler is a firetube boiler or a watertube boiler.

E24. A method of retrofitting a boiler or other fired vessel, the boiler or other fired vessel comprising a housing with a burner, an intermediate furnace, a convection section downstream of the furnace, and a flue gas outlet downstream of the convection section, with a $NO_x$ removal system, the method comprising: determining one or more parameters of the boiler or other fired vessel, wherein at least one of the one or more parameters is selected from the group consisting of internal shape of the boiler or other fired vessel, internal shape of the furnace, internal shape of the convection section, internal shape of the flue gas outlet, peak temperature of the furnace, peak temperature of the convection section, peak temperature of the flue gas outlet, operable temperature range of the furnace, operable temperature range of the convection section, operable temperature range of the flue gas outlet, concentration range of $NO_x$ formation, operable firing range, type of $NO_x$ compounds and concentration range of one or more types of $NO_x$ compounds, operating conditions causing peak $NO_x$ formation and combinations thereof; determining one or more parameters of a $NO_x$ removal system, wherein at least one of the one or more parameters is selected from the group consisting of SCR catalyst to be used, reducing agent to be used, number of reducing agent loading points, locations of reducing agent loading points, type of means for loading reducing agent, timing of reducing agent loading at each reducing agent loading point, concentration of reducing agent loading at each reducing agent loading point, spray pattern of the means for loading reducing agent at each reducing agent loading point, dilution or dilution range of the reducing agent, and combinations thereof; providing, based on the one or more parameters of the $NO_x$ removal system, a first means in communication with the housing for providing a reducing agent into the housing of the boiler or other fired vessel downstream of the furnace, wherein the first means comprises at least two injectors; providing, based on the one or more parameters of the $NO_x$ removal system, a second means in communication with the housing for providing a reducing agent into the housing of the boiler or other fired vessel downstream of the first means for providing reducing agent; and providing, based on the one or more parameters of the $NO_x$ removal system, a selective catalytic reduction catalyst downstream from or simultaneously with the second means for providing a reducing agent.

E25. The method of E24, further comprising providing at least one additional component selected from the group consisting of a temperature sensor in communication with the housing, a metering pump in communication with at least one of the first and second means for providing a reducing agent, a control panel in communication with the at least one of the first and second means for providing a reducing agent and/or the metering pump, a water source connected to at least one of the first and second means for providing a reducing agent, and an air source connected to at least one of the first and second means for providing a reducing agent.

E26. The method of any of E24-E25, wherein the step of determining one or more parameters of the boiler or other fired vessel comprises determining at least one of the peak temperature at the convection section and the operable temperature range at the flue gas outlet.

E27. The method of any of E24-E26, wherein the step of determining one or more parameters of a $NO_x$ removal system comprises determining at least one of the dilution of the reducing agent to be loaded to the convection section of the boiler or other fired vessel, the spray pattern of at least one means for providing a reducing agent, and the reducing agent to be used.

E28. The method of any of E24-E27, wherein the boiler or other fired vessel is selected from the group consisting of a firetube boiler and a watertube boiler.

E29. A boiler assembly comprising: a housing comprising a burner at a first end, a furnace downstream of the burner, a convection section downstream of the furnace, and a flue gas outlet downstream of the convection section; a first means for loading a reducing agent into the housing, wherein the first means for loading the reducing agent is located downstream of the furnace and comprises at least two injectors; a second means for loading a reducing agent into the housing, wherein the second means for loading the reducing agent is located downstream of the first means for loading the reducing agent and comprises at least one injector; and a selective catalytic reduction (SCR) catalyst located either downstream of the second means for loading a reducing agent into the housing or adjacent the second means for loading a reducing agent into the housing such that the SCR catalyst is provided to the boiler approximately simultaneously with the reducing agent from the second means for loading the reducing agent into the housing.

E30. The assembly of E29, wherein the second means for loading the reducing agent comprises at least two injectors.

E31. The assembly of any of E29-E30, wherein the first means for loading a reducing agent is located at the convection section.

E32. The assembly of any of E29-E31, wherein the second means for loading a reducing agent is located at the flue gas outlet.

E33. The assembly of any of E29-E32, wherein the SCR catalyst is located at the flue gas outlet.

E34. The assembly of any of E29-E33, further including a mixing element at the flue gas outlet downstream of the second means for loading a reducing agent.

E35. The assembly of any of E29-E34, further comprising a metering pump in communication with at least one of the first or second means for loading a reducing agent.

E36. The assembly of any of E29-E35, further comprising a temperature sensor proximal to at least one of the first or second means for loading a reducing agent.

E37. The assembly of any of E29-E36, further including a storage tank comprising the reducing agent and connected to at least one of the first or second means for loading a reducing agent.

E38. The assembly of any of E29-E37, further including a water supply connected to at least one of the first or second means for loading a reducing agent.

E39. The assembly of any of E29-E38, further including an air supply connected to at least one of the first or second means for loading a reducing agent.

E40. The assembly of any of E29-E39, wherein the reducing agent is aqueous ammonia or aqueous urea.

E41. The assembly of any of E29-E40, wherein the boiler is a firetube boiler or a watertube boiler.

E42. A boiler assembly comprising a housing comprising a burner, an intermediate furnace, a convection section downstream from the intermediate furnace, and a flue gas outlet downstream of the convection section; a first means for loading a reducing agent into the housing, wherein the first means for loading the reducing agent is located downstream of the furnace and comprises at least two injectors; a second means for loading a reducing agent into the housing, wherein the second means for loading the reducing agent is located downstream of the first means for loading the reducing agent and comprises at least one injector; and a selective catalytic reduction (SCR) catalyst located either downstream of the second means for loading a reducing agent into the housing or adjacent the second means for loading a reducing agent into the housing such that the SCR catalyst is provided to the boiler approximately simultaneously with the reducing agent from the second means for loading the reducing agent into the housing.

E43. The assembly of E42, wherein the boiler is a watertube boiler or a firetube boiler.

E44. A method of reducing $NO_x$ in a boiler which produces a direct flame, the method comprising: providing (a) a first amount of a reducing agent to the boiler at a first location downstream of the direct flame when a temperature of the first location is greater than or equal to a threshold temperature, or (b) a second amount of reducing agent to the boiler at a second location downstream of the direct flame when a temperature of the first location is less than the threshold temperature, wherein the first location is downstream of the second location; and providing a selective catalytic reduction catalyst either downstream of or at generally the same location as second amount of a reducing agent, wherein the first amount of reducing agent is provided using at least two injectors.

E45. The method of E44, wherein the boiler comprises a housing with a burner and furnace at one end, a convection section at a second end, and the flue gas outlet at the end of the convection section and wherein: the step of providing a second amount of a reducing agent includes providing the reducing agent to the convection section, the step of providing a first amount of reducing agent includes providing the reducing agent to the flue gas outlet, and the step of providing a selective catalytic reduction catalyst includes providing the selective catalytic reduction catalyst to the flue gas outlet.

E46. The method of any of E44-E45, wherein the threshold temperature is 425° F.

E47. The method of claim any of E44-E46, further comprising the step of mixing the reducing agent with a carrier fluid before providing the first amount and second amount of the reducing agent.

E48. The method of any of E44-E47, wherein the boiler is a firetube boiler or a watertube boiler.

E49. A method of retrofitting a boiler, the boiler comprising a housing with a burner, an intermediate furnace, a convection section downstream of the furnace, and a flue gas outlet downstream of the convection section, with a $NO_x$ removal system, the method comprising: determining one or more parameters of the boiler, wherein at least one of the one or more parameters is selected from the group consisting of internal shape of the boiler or other fired vessel, internal shape of the furnace, internal shape of the convection section, internal shape of the flue gas outlet, peak temperature of the furnace, peak temperature of the convection section, peak temperature of the flue gas outlet, operable temperature range of the furnace, operable temperature range of the convection section, operable temperature range of the flue gas outlet, concentration range of $NO_x$ formation, operable firing range, type of $NO_x$ compounds and concentration range of one or more types of $NO_x$ compounds, operating conditions causing peak $NO_x$ formation and combinations thereof; determining one or more parameters of a $NO_x$ removal system, wherein at least one of the one or more parameters is selected from the group consisting of SCR catalyst to be used, reducing agent to be used, number of reducing agent loading points, locations of reducing agent loading points, type of means for loading reducing agent, timing of reducing agent loading at each reducing agent loading point, concentration of reducing agent loading at each reducing agent loading point, spray pattern of the means for loading reducing agent at each reducing agent loading point, dilution or dilution range of the reducing agent, and combinations thereof; providing, based on the one or more parameters of the $NO_x$ removal system, a first means in communication with the housing for providing a reducing agent into the housing of the boiler downstream of the furnace, wherein the first means comprises at least two injectors; providing, based on the one or more parameters of the $NO_x$ removal system, a second means in communication with the housing for providing a reducing agent into the housing of the boiler downstream of the first means for providing reducing agent; and providing, based on the one or more parameters of the $NO_x$ removal system, a selective catalytic reduction catalyst downstream from or simultaneously with the second means for providing a reducing agent.

E50. The method of E49, further comprising providing at least one additional component selected from the group consisting of a temperature sensor in communication with the housing, a metering pump in communication with at least one of the first and second means for providing a reducing agent, a control panel in communication with the at least one of the first and second means for providing a reducing agent and/or the metering pump, a water source connected to at least one of the first and second means for providing a reducing agent, and an air source connected to at least one of the first and second means for providing a reducing agent.

E51. The method of any of E49-E50, wherein the step of determining one or more parameters of the boiler or other fired vessel comprises determining at least one of the peak temperature at the convection section and the operable temperature range at the flue gas outlet.

E52. The method of any of E49-E51, wherein the step of determining one or more parameters of a $NO_x$ removal system comprises determining at least one of the dilution of the reducing agent to be loaded to the convection section of the boiler or other fired vessel, the spray pattern of at least one means for providing a reducing agent, and the reducing agent to be used.

E53. The method of any of E49-E52, wherein the boiler is selected from the group consisting of a firetube boiler and a watertube boiler.

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Among other things, it should be appreciated that the scope of the present disclosure is not limited to the number of constituting components, the materials thereof, the shapes thereof, the relative arrangement thereof, etc., as described above, but rather the above disclosures are simply provided as example embodiments.

Thus, it is specifically intended that the present invention not be limited to the embodiments and illustrations contained herein, but include modified forms of those embodiments including portions of the embodiments and combinations of elements of different embodiments as come within the scope of the following claims.

What is claimed is:

1. A boiler or other fired vessel assembly comprising:
   a housing comprising a burner at a first end, a furnace downstream of the burner, a convection section downstream of the furnace, and a flue gas outlet downstream of the convection section;
   a first means for loading a reducing agent into the housing, wherein the first means for loading the reducing agent is located downstream of the furnace and comprises at least two injectors;
   a second means for loading a reducing agent into the housing, wherein the second means for loading the reducing agent is located downstream of the first means for loading the reducing agent and comprises at least one injector;
   a selective catalytic reduction (SCR) catalyst located either downstream of the second means for loading a reducing agent into the housing or adjacent the second means for loading a reducing agent into the housing such that the SCR catalyst is provided to the boiler or other fired vessel approximately simultaneously with the reducing agent from the second means for loading the reducing agent into the housing;
   a temperature sensor located at the second means for loading a reducing agent;
   a control panel in communication with the temperature sensor, the control panel being configured to control loading of the reducing agent into the housing by the first means for loading a reducing agent and the second means for loading a reducing agent, wherein the control panel is further configured to cause the reducing agent to be provided by the second means for loading a reducing agent when a temperature measured by the temperature sensor is greater than or equal to a threshold temperature.

2. The assembly of claim 1, wherein the second means for loading the reducing agent comprises at least two injectors.

3. The assembly of claim 1, wherein the first means for loading a reducing agent is located at the convection section.

4. The assembly of claim 1, wherein the second means for loading a reducing agent is located at the flue gas outlet.

5. The assembly of claim 1, wherein the SCR catalyst is located at the flue gas outlet.

6. The assembly of claim 1, further including a mixing element at the flue gas outlet downstream of the second means for loading a reducing agent.

7. The assembly of claim 1, further comprising a metering pump that is controlled by the control panel, the metering pump being in communication with at least one of the first or second means for loading a reducing agent.

8. The assembly of claim 1, wherein the control panel is further configured to cause the reducing agent to be provided by the first means for loading a reducing agent when a temperature measured by the temperature sensor is less than the threshold temperature.

9. The assembly of claim 1, further including a water supply connected to at least one of the first or second means for loading a reducing agent.

10. The assembly of claim 1, further including an air supply connected to at least one of the first or second means for loading a reducing agent.

11. The assembly of claim 1, wherein the boiler or other fired vessel further comprises a rear turn around space between the furnace and the convection section, and the first means for loading a reducing agent is located at the rear turn around space.

12. The assembly of claim 11, wherein the boiler or other fired vessel is a firetube boiler or a watertube boiler.

\* \* \* \* \*